(12) United States Patent
Merriam et al.

(10) Patent No.: US 6,249,537 B1
(45) Date of Patent: Jun. 19, 2001

(54) METHOD AND APPARATUS FOR SINGLE LONGITUDINAL MODE OPERATION OF PULSED LASER OSCILLATORS USING EFFICIENT SELF-SEEDING

(75) Inventors: Andrew Merriam, Palo Alto; Guang-Yu Yin, Mountian View, both of CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/304,434

(22) Filed: May 3, 1999

(51) Int. Cl.[7] ........................................................ H01S 3/08
(52) U.S. Cl. ............................ 372/102; 372/19; 372/20; 372/99
(58) Field of Search .................................... 372/9, 19, 20, 372/24, 92, 97, 98, 99, 102

(56) References Cited

U.S. PATENT DOCUMENTS

| | | | | |
|---|---|---|---|---|
| 5,081,630 | * | 1/1992 | Lowenthal et al. ..................... | 372/20 |
| 5,577,058 | * | 11/1996 | Kafka et al. ............................ | 372/20 |
| 5,633,884 | | 5/1997 | Lee et al. ................................ | 372/20 |
| 5,889,800 | * | 3/1999 | Kafka et al. ............................ | 372/20 |
| 6,016,323 | * | 1/2000 | Kafka et al. ............................ | 372/20 |

OTHER PUBLICATIONS

Ko, Do–Kyong et al., "Self–seeding in a Dual–cavity–type Pulsed Ti: Sapphire Laser Oscillator" Optics Letters, vol. 20 No. 7, Apr. 1, 1995, pp. 710–712.

* cited by examiner

Primary Examiner—John D. Lee
(74) Attorney, Agent, or Firm—Lumen Intellectual Property Services

(57) ABSTRACT

A self-seeding laser comprises a slave oscillator cavity coupled to a Littman cavity that operates in a single longitudinal mode. The slave oscillator cavity comprises the following elements positioned in sequential order to provide a first beam path: an end mirror, a gain medium, a grating having a groove spacing, and an output mirror. The first beam path has an angle of incidence upon the grating, and light traveling along the first beam path is zeroth-order diffracted by the grating. A tuning mirror faces the grating, for reflecting light diffracted away from the first beam path by the grating. The tuning mirror establishes the Littman cavity. The gain medium is pumped by a pulsed pump beam. The pump beam activates a pump region within the gain medium, the pump region having a radius. The Littman cavity operates in the single longitudinal mode because the angle of incidence, the groove spacing, and the radius are adjusted so that an adjacent mode walk-off time of the Littman cavity is less than a mode build-up time of the Littman cavity. A gain in the Littman cavity is initially greater than a gain in the slave oscillator cavity; the laser is thereby self-seeded in the single longitudinal mode.

10 Claims, 7 Drawing Sheets

METHOD AND APPARATUS FOR SINGLE LONGITUDINAL MODE OPERATION OF PULSED LASER OSCILLATORS USING EFFICIENT SELF-SEEDING

U.S. GOVERNMENT RIGHTS

This invention was supported by U.S. Army grant number DAAG55-98-1-0031. The U.S. government has certain rights in this invention.

FIELD OF THE INVENTION

This invention pertains generally to laser oscillators, and in particular to single longitudinal mode operation of a coupled cavity, self seeding laser pumped by a pulsed source.

BACKGROUND OF THE INVENTION

Lasers that are tunable over a wide range of wavelengths and have a narrow linewidth are desirable for a number of applications, including, for example, laser radar, isotope separation, remote sensing, medicine, and lithography. One such tunable laser uses a diffraction grating inside the laser cavity and a gain medium that, when pumped, fluoresces over a broad range of wavelengths. The angle of the diffraction grating inside this so-called Littman cavity is adjusted so that only the desired wavelength of light is amplified by the cavity.

The main difficulty with the Littman cavity is that its grating has a low diffraction efficiency. Most of the cavity light is lost due to ordinary mirror, or specular, reflection from the grating. Therefore the Littman cavity gives only a low powered laser.

This problem was partially solved by Lee, Cha, Kim, and Ko in Optics Letters 20 (1995) pp. 710–712 and U.S. Pat. No. 5,633,884. Lee et al. use a Littman cavity coupled to a second, slave oscillator. The light in the Littman cavity is amplified by the slave oscillator to overcome the power restrictions of the Littman cavity operating alone.

In this coupled oscillator approach, the gain medium is activated using an external laser pulse. Light first builds up in the Littman cavity. The power in the Littman cavity then "seeds" the gain medium, whose induced emission circulates in and is amplified by the slave oscillator. The light circulating in the slave oscillator is specularly reflected from the grating. Therefore, light that was previously lost to specular reflection in the Littman cavity alone is recaptured and amplified in the method of Lee et al. The self-seeding coupled oscillators yield a laser with increased power.

However, the laser of Lee et al. still has some drawbacks. For the narrowest linewidth possible, the laser should operate in a single longitudinal mode. However, the laser of Lee et al. typically operates in several longitudinal modes at once, thereby giving a broader than optimum linewidth.

OBJECTS AND ADVANTAGES

It is therefore a primary object of the present invention to provide a Littman oscillator coupled to a slave oscillator, the components of the coupled cavity oscillators being arranged so that the Littman oscillator operates in a single longitudinal mode. It is also an object of the present invention to provide a method for efficient self-seeding of the coupled oscillators. These objects yield a tunable laser having a minimal linewidth and a high power.

SUMMARY OF THE INVENTION

A self-seeding laser comprises a slave oscillator cavity having the following elements positioned sequentially to provide a first beam path of length $L_1$: an end mirror, a gain medium, a grating having a groove spacing d, and an output mirror. The first beam path has an angle of incidence θ upon the grating, and the beam path is defined by zeroth order diffraction of the grating. The laser also comprises a tuning mirror facing the grating, for reflecting light that is first-order diffracted away from the first beam path by the grating. The tuning mirror provides a Littman cavity of length $L_2$ comprising the end mirror, the gain medium, the grating, and the tuning mirror. An angle φ between a normal to the tuning mirror and a normal to the grating is adjusted to specify a wavelength λ of light that circulates in the Littman cavity.

The gain medium is pumped by a pulsed pump beam. The pump beam activates a pump region within the gain medium, the pump region having a radius w. After the gain medium is pumped, a mode build-up time is required for a longitudinal mode in the Littman cavity to build up energy. Only the mode having wavelength λ builds up appreciable energy in the Littman cavity, because other modes walk off of the pump region due to the dispersion of the grating. An adjacent mode walk-off time $t_w$ is defined as the time it takes for the modes adjacent to the mode of wavelength λ to walk off of the pump region. Adjacent mode walk-off time $t_w$ is equal to $2\,(2\,d\,w\,\cos\theta)^{1/2} L_2/(\lambda c)$, where c is the speed of light. Single longitudinal mode operation of the laser is obtained by selecting the angle of incidence θ, the groove spacing d, and the radius w to make $t_w$ greater than the mode build-up time.

Immediately after the gain medium is pumped by the pump beam, the slave oscillator cavity has a first gain, and the Littman cavity has a second gain. The gains depend on the lengths $L_1$ and $L_2$ of the cavities. The lengths are adjusted so that the first gain is less than the second gain, thereby enabling the Littman cavity to "seed" the slave oscillator cavity.

DETAILED DESCRIPTION

Figure 1:
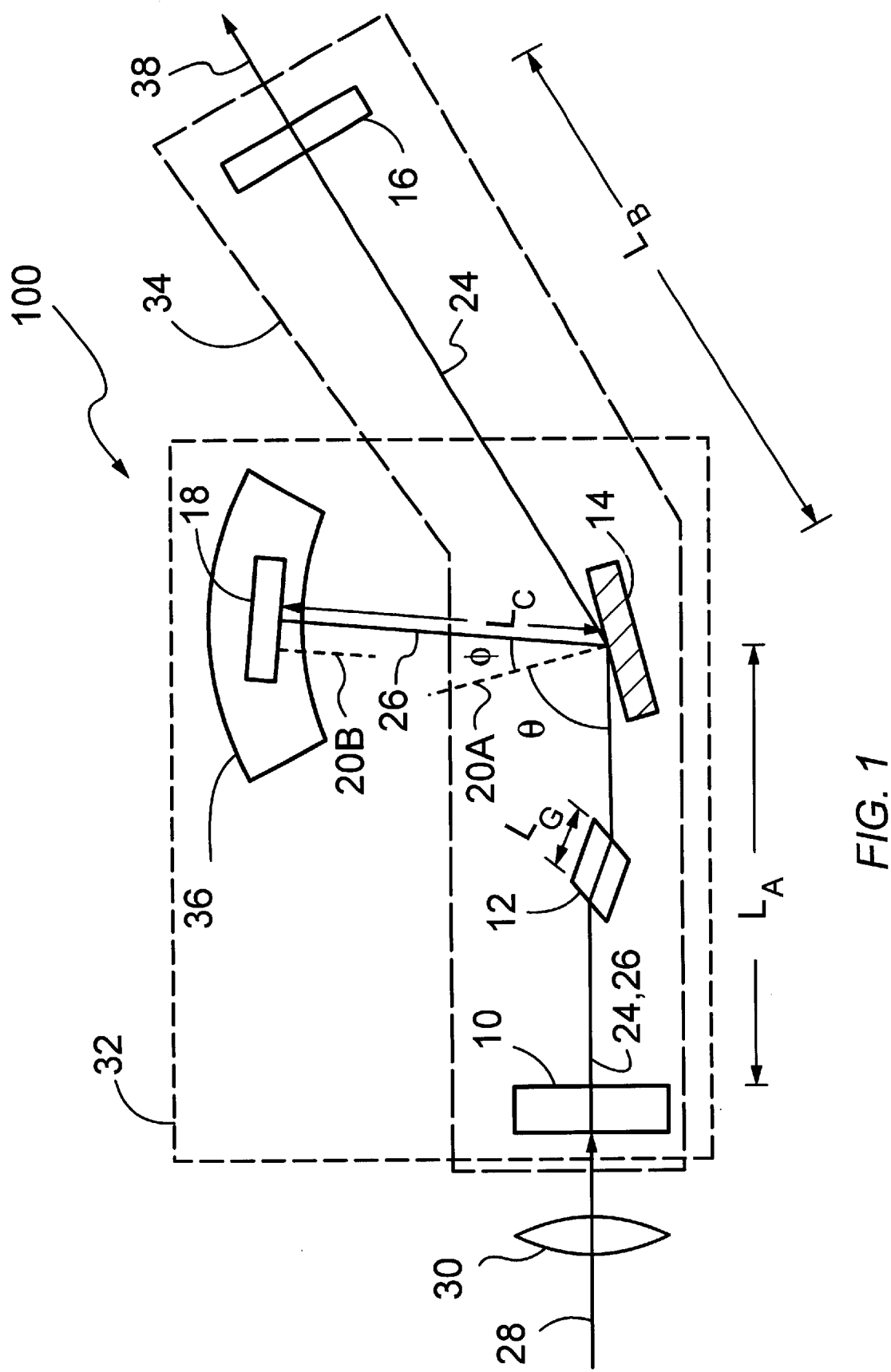
FIG. 1 shows a laser according to the primary embodiment of the invention, the laser comprising a Littman cavity and a slave oscillator cavity.

FIG. 1 shows a laser 100 according to a preferred embodiment of the invention. Laser 100 comprises an end mirror 10, a laser gain medium 12, a diffraction grating 14, an output mirror 16, and a tuning mirror 18. Laser 100 comprises two coupled cavities: a Littman cavity 32, and a slave oscillator cavity 34. Littman cavity 32 comprises end mirror 10, gain medium 12, grating 14, and tuning mirror 18. Slave oscillator cavity 34 comprises end mirror 10, gain medium 12, grating 14, and output mirror 16.

Light circulates along a resonant beam path 24 within slave oscillator cavity 34. As shown in FIG. 1, beam path 24 extends from end mirror 10, through gain medium 12, to grating 14, and on to output mirror 16. Beam path 24 is incident upon grating 14 with an angle of incidence θ, measured between beam path 24 and a normal 20A to grating 14. Light traveling along beam path 24 is specularly reflected by grating 14. In other words, beam path 24 is the path followed by light having an angle of reflection from grating 14 equal to the angle of incidence θ.

Within Littman cavity 32, light travels along a Littman beam path 26. Littman beam path 26 extends from end mirror 10, through gain medium 12, to grating 14, and then to tuning mirror 18. Littman beam path 26 is coincident with beam path 24 between end mirror 10 and grating 14. However, the light traveling along Littman beam path 26 is diffracted away from beam path 24 by grating 14. Littman beam path 26 strikes tuning mirror 18, whereas beam path 24 strikes output mirror 16.

Figure 2:
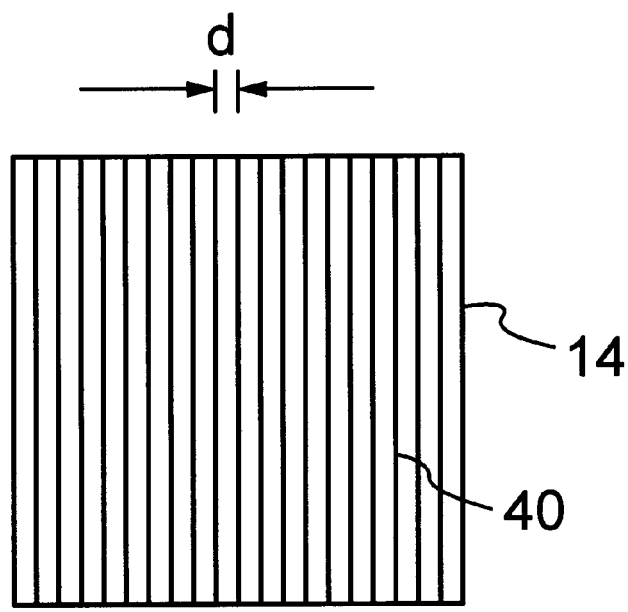
FIG. 2 shows a grating of the type used in the laser of FIG. 1.

Light traveling along Littman beam path 26 is incident upon grating 14 with angle of incidence θ, and is diffracted by an angle of diffraction φ measured with respect to normal 20A. As shown in FIG. 2, grating 14 has a groove spacing d between grooves 40. Angle of incidence θ and angle of diffraction φ are related by the grating formula:

$$\sin\theta = \sin\phi + n\lambda/d \qquad (1)$$

where λ is the wavelength of the light diffracted, and n is an integer, called the diffraction order. In the preferred embodiment, n=1. Angle of diffraction φ may be either positive or negative; in FIG. 1 φ is positive.

Using Eq. (1) and allowing the diffraction order n to equal 0 results in the following descriptions of beam paths 24 and 26. Light traveling along beam path 24 is zeroth-order diffracted by grating 14. Light traveling along beam path 26 is first-order diffracted by grating 14.

Littman beam path 26 has normal incidence upon tuning mirror 18. Angle φ is therefore also the angle between the normal 20A to grating 14 and a normal 20B to tuning mirror 18. In the preferred embodiment, tuning mirror 18 is attached to a mount 36 that allows tuning mirror 18 to be rotated, thereby changing the angle φ. A change in angle φ causes the wavelength circulating in the Littman cavity to change, as can be seen from Eq. (1). Angle φ is therefore selected by appropriate placement of tuning mirror 18 to cause light of any desired wavelength to circulate in Littman cavity 32.

During operation of laser 100, a pulsed pump beam 28 enters the laser through mirror 10. Mirror 10 is preferably a dichroic mirror that transmits pump beam 28, yet reflects light traveling along beam paths 24 and 26 inside the laser. Pump beam 28 is preferably focused by a lens 30.

Figure 3:
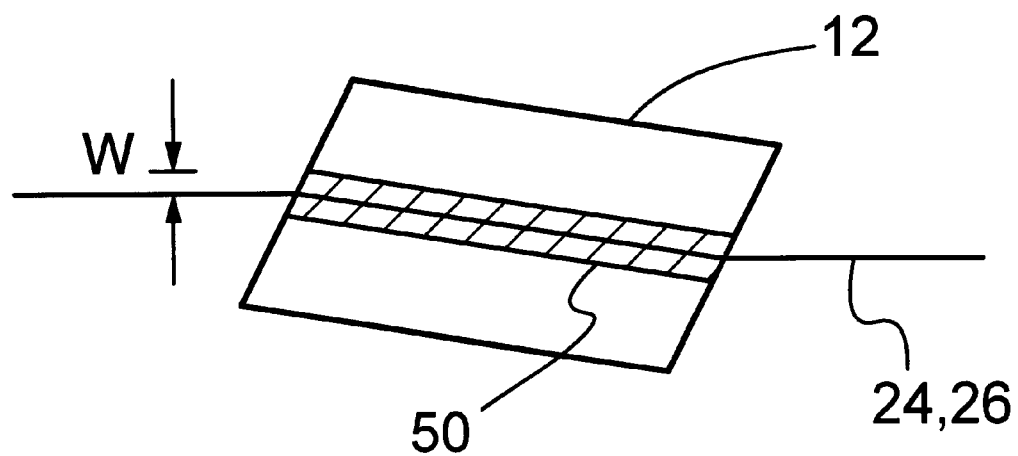
FIG. 3 shows a gain medium used by the laser of FIG. 1.

Pump beam 28 delivers a pulse of energy that activates gain medium 12. A manifold of metastable states in gain medium 12 are thereby excited. Pump beam 28 traverses a pump region 50 within gain medium 12; see FIG. 3. Only within pump region 50 is gain medium 12 excited. A radius w of the pump region is partially determined by the focal length of lens 30.

Once activated by the pump beam, gain medium 12 begins to fluoresce in all directions, some of the fluorescence traveling along beam paths 24 and 26. Only light having wavelength near λ, as given by Eq. (1), circulates in Littman cavity 32. Light intensity builds up in the Littman cavity first, and in the slave oscillator cavity second. The Littman cavity amplifies light having a wavelength approximately equal to λ, and thereby "seeds" the slave oscillator cavity at wavelength λ. Subsequently, light intensity having wavelength λ builds up further in the slave oscillator cavity.

Output mirror 16 is a partially reflecting mirror. Light exits slave oscillator cavity 34 through output mirror 16, resulting in an output laser beam 38.

In the present embodiment, Littman cavity 32 operates in a single longitudinal mode because other modes are dispersed by grating 14. Littman cavity 32 has a length $L_2$ equal to $L_A + L_C$, as shown in FIG. 1:

$$L_2 = L_A + L_C.$$

There are two modes adjacent to the mode of wavelength λ, one adjacent mode having a wavelength longer than λ, and the other adjacent mode having a shorter wavelength. The wavelengths of the adjacent modes are, respectively, $\lambda \pm \Delta\lambda$, where $\Delta\lambda = \lambda^2/2L_2$.

In laser 100, the adjacent modes walk off from gain medium 12 before they can build up appreciable energy in Littman cavity 32. This walk-off arises from the fact that, as shown in Eq. (1), the angle of diffraction varies with the wavelength of light and the angle of incidence. When light in the adjacent mode having wavelength $\lambda + \Delta\lambda$ is incident upon grating 14 with angle of incidence θ, the light is diffracted at an angle $\phi + \Delta\phi$, where $\Delta\phi$ is determined by Eq. (1). This light is reflected by tuning mirror 18 and diffracted once again by grating 14. After one round trip through the Littman cavity, the mode of wavelength $\lambda + \Delta\lambda$ is incident upon grating 14 with an angle $\theta + \Delta\theta_1$, where $\Delta\theta_1 = (d\theta/d\lambda) \Delta\lambda$. Because of the offset angle $\Delta\theta_1$, the mode is also laterally displaced from Littman beam path 26 by an amount approximately equal to $(\lambda^2/2) d\theta/d\lambda$. For the $N^{th}$ round trip the displacement added is $(N-\frac{1}{2}) \lambda^2 (d\theta/d\lambda)$. After N round trips, it can be shown using first order ray tracing that the total lateral displacement, or mode discrimination walk-off (MDW), is $$MDW = N^2 \lambda^2 / (2d \cos\theta). \qquad (2)$$

When the mode discrimination walk-off is equal to the radius w, the adjacent modes have walked off of pump region 50 and are no longer amplified.

To find the number of round trips N' that it takes for the adjacent modes to completely walk off of the pump region, Eq. (2) is solved for N using MDW=w. The result is $$N' = (2d \, w \, \cos\theta)^{\frac{1}{2}}/\lambda.$$

For single longitudinal mode operation of laser 100, N' must be less than the number M of round trips it takes for a mode to build up in the Littman cavity:

$$N' < M. \qquad (3)$$

The number M depends on a composition of the gain medium, a power of the pump beam, reflectivities of the mirrors, and other parameters known to one skilled in the art. The number M is best determined experimentally. Groove spacing d, radius w, and angle of incidence θ are adjusted to achieve the condition of Eq. (3). It is preferred that θ be greater than 85°, to force N' to be small.

Figure 8:
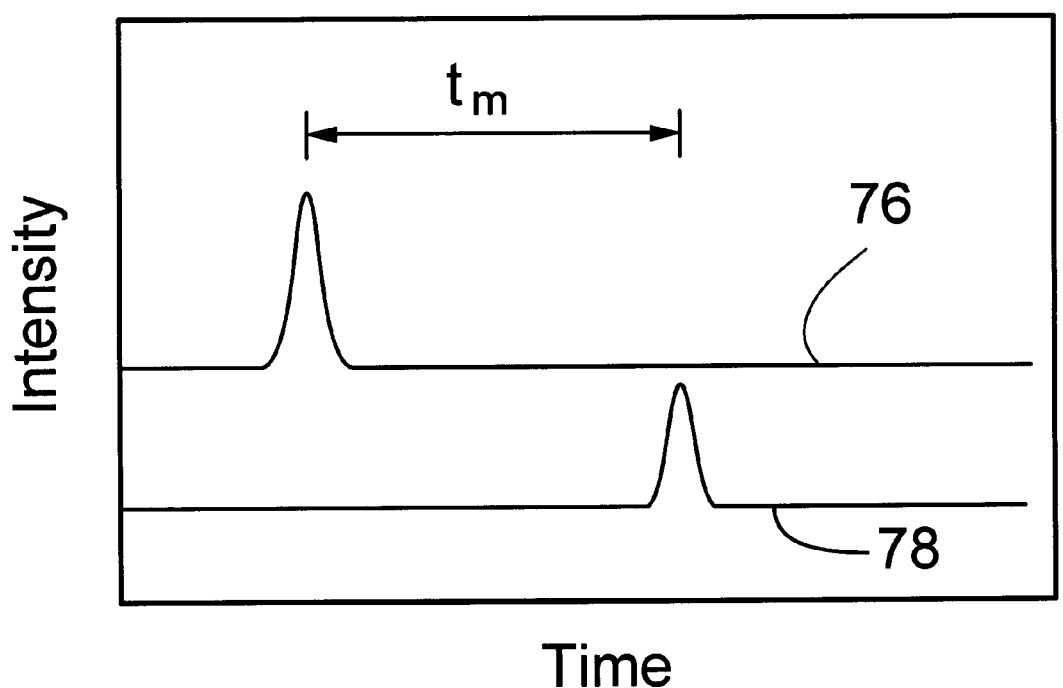
FIG. 8 is a schematic of the time profiles of an intensity of a pump beam and an intensity inside the Littman cavity.

Another expression of Eq. (3) is obtained from the following considerations: an adjacent mode walk-off time $t_w$ is the time it takes the adjacent modes to walk off the pump region: $t_W = N' (2L_2)/c = 2 (2 d w \cos\theta)^{1/2} L_2/(\lambda c)$. FIG. 8 shows a schematic time profile of an intensity 76 of the pump beam and an intensity 78 present in the Littman cavity. A mode build-up time tm is the time difference between a peak intensity of the pump beam and a peak intensity in the Littman cavity, as shown in FIG. 8. Mode build-up time $t_m$ is related to M by: $t_m = 2 M L_2/c$. Littman cavity 32 operates in a single mode because the adjacent mode walk-off time is less than the mode build-up time:

$$t_W < t_m. \quad (4)$$

During the operation of laser 100, pump beam 28 deposits a pulse of energy in gain medium 12. Immediately after the pump beam activates the gain medium, a gain in Littman cavity 32 is greater than a gain in slave oscillator cavity 34. Therefore, energy initially builds up in the Littman cavity. As time progresses, the gains of the two cavities change due to the depletion of energy stored within gain medium 12. The slave oscillator cavity begins to dominate, creating output beam 38 having a linewidth substantially as narrow as the single mode at wavelength λ of the Littman cavity. Because the Littman cavity builds up energy before the slave oscillator cavity builds up energy, the Littman cavity "seeds" the slave oscillator cavity. Laser 100 is therefore referred to as a self-seeding laser.

The gain switching from the Littman cavity to the slave oscillator cavity is described more quantitatively as follows. The energy density in the slave oscillator cavity is denoted $\Phi_1$; the energy density in the Littman cavity is $\Phi_2$. Slave oscillator cavity 34 has length $L_1 = L_A + L_B$, as shown in FIG. 1. As has already been noted, Littman cavity 32 has length $L_2 = L_A + L_C$. The slave oscillator cavity has a photon lifetime $\tau_1$; the Littman cavity has a photon lifetime $\tau_2$. The lifetimes $\tau_1$, and $\tau_2$ may be calculated from the reflectivites of end mirror 10, output mirror 16, tuning mirror 18, and the specular reflection and diffraction efficiencies of grating 14. The rate of change of energy density in each cavity depends on the respective length of the cavity, the respective photon lifetime, a length $L_G$ of gain medium 12, a density of excited states, or inversion density N* in gain medium 12, and an emission cross section a of gain medium 12:

$$\frac{d\Phi_i}{dt} = \left(\frac{L_G}{L_i} N^* \sigma c - \frac{1}{\tau_i}\right)\Phi_i \equiv G_i \Phi_i \quad (5)$$

In Eq. (5), i=1 or 2, corresponding to the slave oscillator cavity or the Littman cavity, respectively. The constant c is, as usual, the speed of light. The gains $G_1$ and $G_2$ of the slave oscillator cavity and of the Littman cavity, respectively, are defined by Eq. (5).

Figure 4:
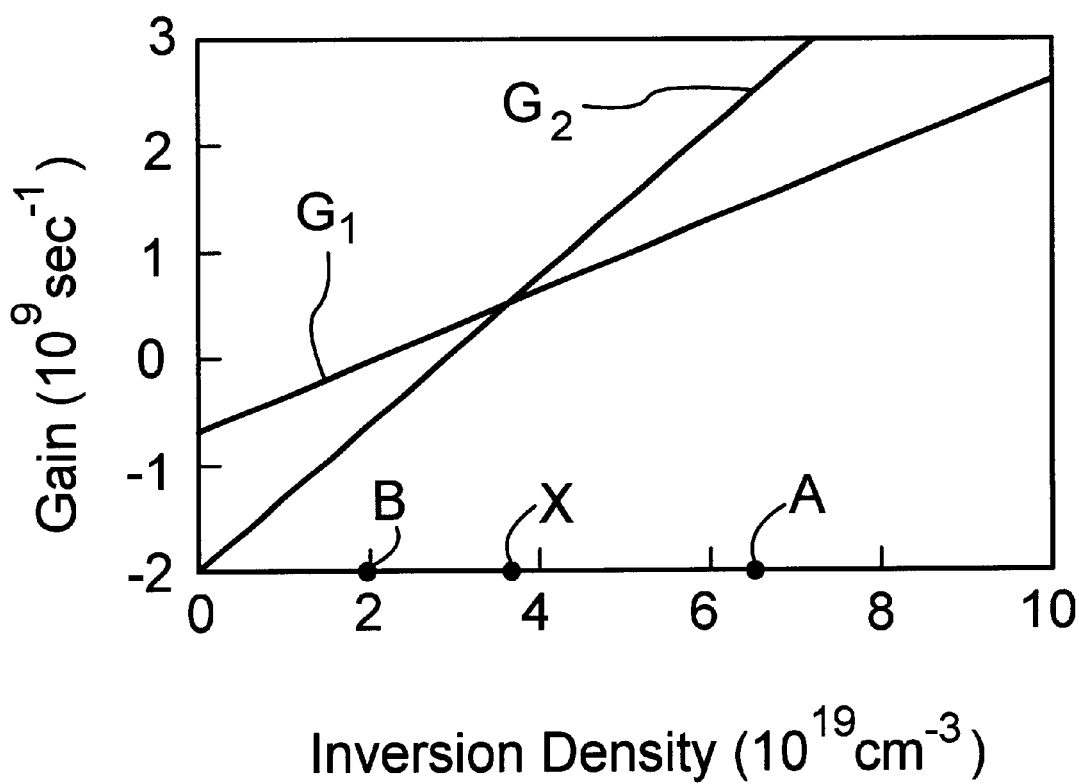
FIG. 4 illustrates exemplary gain curves of the Littman cavity and of the slave oscillator cavity.

FIG. 4 shows an example of a graph of $G_1$ and $G_2$ versus N*. Both $G_1$ and $G_2$ are linearly dependent upon N*. However, $L_1 < L_2$, so according to Eq. (5), the graph of $G_1$ rises more steeply than the graph of $G_2$. In an example of the operation of laser 100, immediately after a pulse of energy is received from pump beam 28, the inversion density N* is represented by a point A in FIG. 4. At this point, $G_2 > G_1$, so the Littman cavity builds up energy faster than the slave oscillator cavity, therefore enabling a single mode to be seeded.

As time passes the inversion density is depleted. N* decreases from A to a point X of FIG. 4, where the gain curves cross. Amplification of the laser mode continues, primarily in the slave oscillator cavity, from the point X to a point B. Between X and B, $G_1 > G_2$, so the slave oscillator cavity dominates. At point B the gain $G_2=0$, and laser 100 stops lasing until another pulse is received from pump beam 28. In the region where $G_1 > G_2$, laser 100 extracts more power from gain medium 12 than would Littman cavity 32 operating alone.

Output mirror 16 has a reflectivity chosen to optimize energy extraction from the slave oscillator cavity. The optimum reflectivity is obtained using the well-known Rigrod analysis (see, for example, A. E. Siegman, Lasers, University Science, Mill Valley, Calif. 1986). Output mirror 16 has a low enough reflectivity that the slave oscillator cavity has a low finesse. This low finesse is a desired property, since it means that the slave oscillator cavity does not have a pronounced mode structure, and can therefore couple to any desired mode of the Littman cavity. Fine adjustment of the length $L_B$ may further improve the mode-matching of the slave oscillator cavity to the Littman cavity.

Gain medium 12 comprises any fluorescent material, examples of which are given in Table 1, below. For information regarding the color center medium see A. Dergachev and S. Mirov, "Efficient room-temperature LiF:$F_2+$** color center laser tunable in 820–1210 nm range," Opt. Comm. 147 (1998) p. 107. Table 1 also lists examples of sources of pump beam 28. In some embodiments, pump beam 28 does not pass through end mirror 10, but strikes gain medium 12 at an angle with respect to beam path 24. In other embodiments, gain medium 12 is pumped by a flashlamp.

TABLE 1

| Gain Medium | Pumped by . . . | to produce wavelengths |
|---|---|---|
| Ti: Sapphire | Argon ion doubled Nd:YAG flashlamp solid state diode | 670–1000 nm |
| organic laser dye | Argon ion doubled Nd:Yag tripled Nd:Yag flashlamp solid state diode | 450–700 nm |
| color center | Alexandrite Raman-shifted doubled Nd:Yag solid state diode | 750–1200 nm |

EXAMPLE

The following example is intended to clarify the foregoing description, and is not intended to limit the scope of the invention.

An example of laser 100 has the following characteristics: $L_1 \approx 43$ cm; $L_2 \approx 21$ cm. Output mirror 16 has a 24% reflectivity; end mirror 10 is a high reflectivity dichroic mirror, and tuning mirror 18 is high reflectivity mirror. All of the mirrors are flat. Gain medium 12 is a Brewster-oriented titanium doped sapphire (Ti:Sapphire) rod available from Crystal Systems having length $L_G=20$ mm and diameter 9 mm. The gain medium is doped for 1.67 $cm^{-1}$ absorption at 532 nm.

Grating 14, available from Optometrics Group, has groove spacing d given by 1/d=1800 $mm^{-1}$. Grating 14 has a 500 nm blaze, a 350 mJ/$cm^2$ damage threshold, and is oriented so that angle of incidence θ≈88.6°. This grazing incidence not only increases dispersion, but also reduces the circulating beam power density on the easily damaged grating. The n=1 diffraction efficiency, which is a strong function of the angle of incidence, is approximately 7% at this angle of incidence; the specular reflection efficiency is approximately 70%.

Pump beam 28 is produced by a 10 Hz, frequency doubled Quanta Ray DCR-1A 1.06 μm Nd:YAG laser modified with a Gaussian-reflectivity mirror unstable cavity to produce a filled-in-mode beam with a 6 ns pulse duration. Lens 30 has a focal length of 25 cm, and focuses the pump beam 3 cm beyond the gain medium. The pump region has a radius of w=0.5 mm, or a diameter (full width at half-maximum) of 1 mm.

Single longitudinal mode operation was achieved from less than 700 nm to 810 nm. The number of round trips required for adjacent modes to walk off, N', is approximately 5. The number of round trips for mode build-up, M, is approximately 15. The mode build-up time $t_m$ is approximately 20 nsec. Output beam 38 has a full width at half-maximum of 118 MHz.

Figure 5:
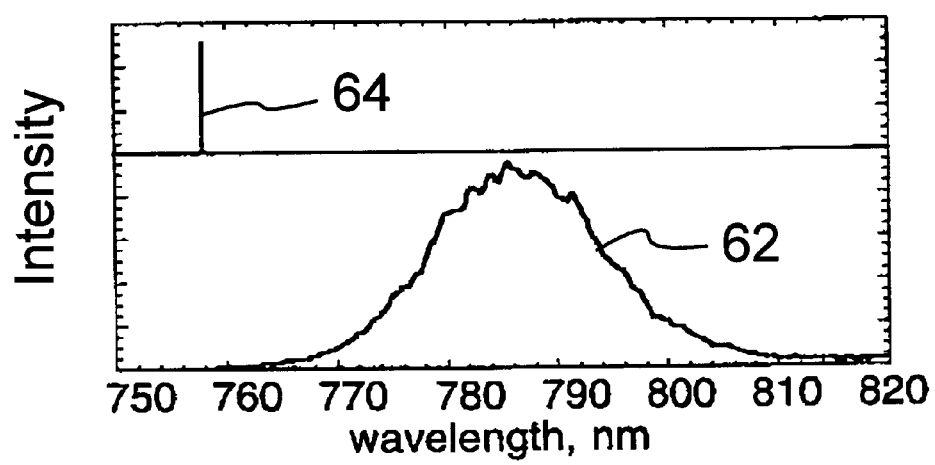
FIG. 5 illustrates an example of an output of the slave oscillator cavity alone, and an example of an output of the laser of FIG. 1.

FIG. 5 shows an output 62 of slave oscillator cavity 34 operating alone; that is, with tuning mirror 18 removed. An output 64 of laser 100 with both cavities 32 and 34 operating according to the preferred embodiment. Output 62 shows the broad band emission characteristic of the Ti:sapphire used for gain medium 12. Output 64 illustrates the successful self-seeding of a single longitudinal mode.

Figure 6:
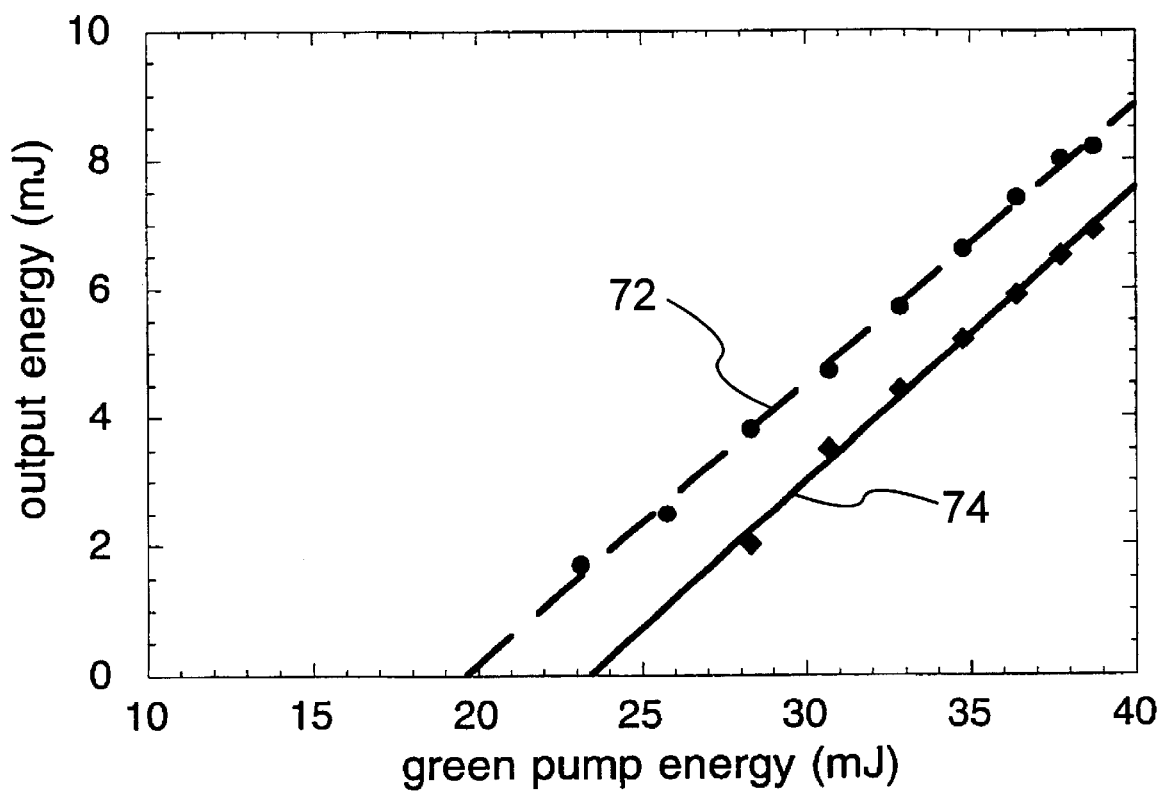
FIG. 6 gives exemplary output energies of the slave oscillator cavity alone and of the laser of FIG. 1

FIG. 6 shows graphs of output energies of output beam 38 versus the pump energy of pump beam 28. A broadband output energy 74 is the energy output from the slave oscillator cavity operating alone. A single longitudinal mode output energy 72 is the energy of output beam 38 when laser 100 operates in a single longitudinal mode.

Figure 7:
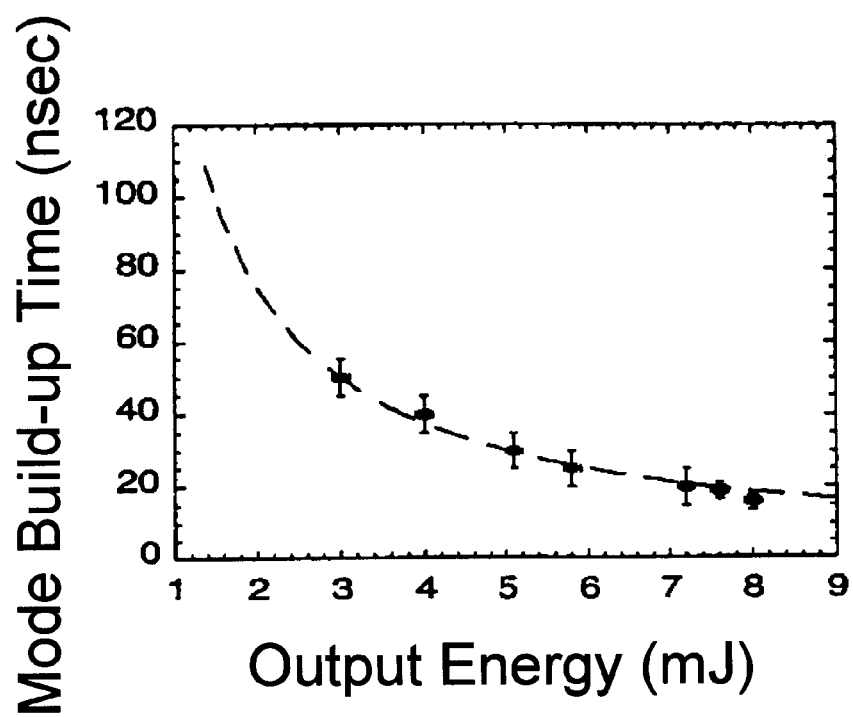
FIG. 7 is an example of a graph of a mode build-up time of the laser of FIG. 1.

FIG. 7 is a graph of the mode build-up time $t_m$ versus the single longitudinal mode output energy. This concludes the example.

OTHER EMBODIMENTS

Laser 100 is the currently preferred embodiment. However, the laser may be altered in many ways that remain within the scope of the invention. Such alterations include:

1. A heat sink or cooling element placed in thermal contact with gain medium 12, to accommodate high pump powers from pump beam 28.

Figure 9:
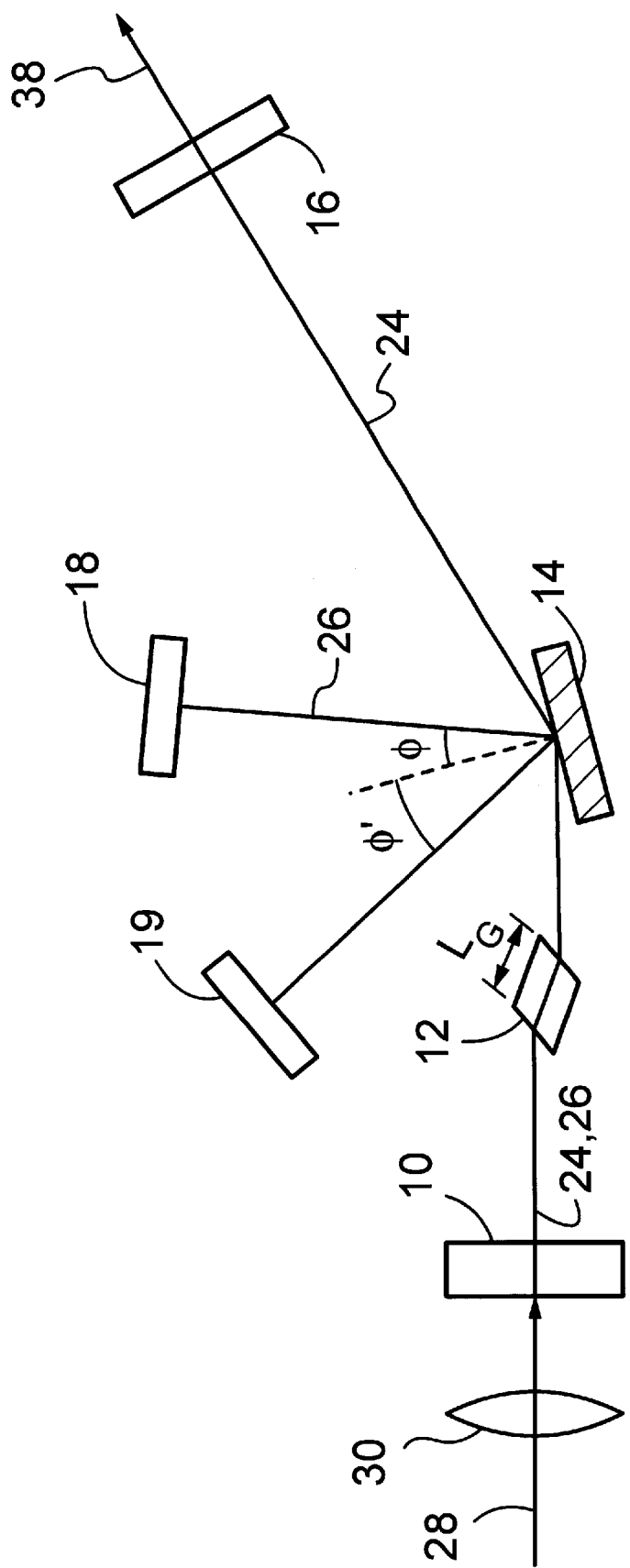
FIG. 9 shows a embodiment comprising two tuning mirrors.

2. One or more additional tuning mirrors positioned to retroflect one or more additional wavelengths diffracted from grating 14, to provide a laser that lases at more than one wavelength simultaneously. FIG. 9 illustrates a laser comprising a second tuning mirror 19 positioned to reflect light of wavelength λ' diffracted at an angle φ'. In this embodiment, it is preferred that tuning mirror 18 reflects first order diffracted light, and second tuning mirror 19 reflects second order diffracted light. The plurality of tuning mirrors provide a plurality of Littman cavities, each characterized by an adjacent mode walk-off time that is less than a respective mode build-up time. Each of the Littman cavities operates in a single longitudinal mode.

3. Modifications that make slave oscillator cavity 34 an unstable resonator. In the embodiment of FIG. 1, all of the mirrors are flat, and slave oscillator cavity 34 is therefore stable. Making slave oscillator cavity 34 unstable will increase the power that can be extracted from the gain medium.

4. A Pockels cell or similar electro-optic device installed to modulate a cavity-Q of the laser, thereby allowing a Q-switched operation. In the embodiment of FIG. 1, the laser is gain-switched.

Figure 10:
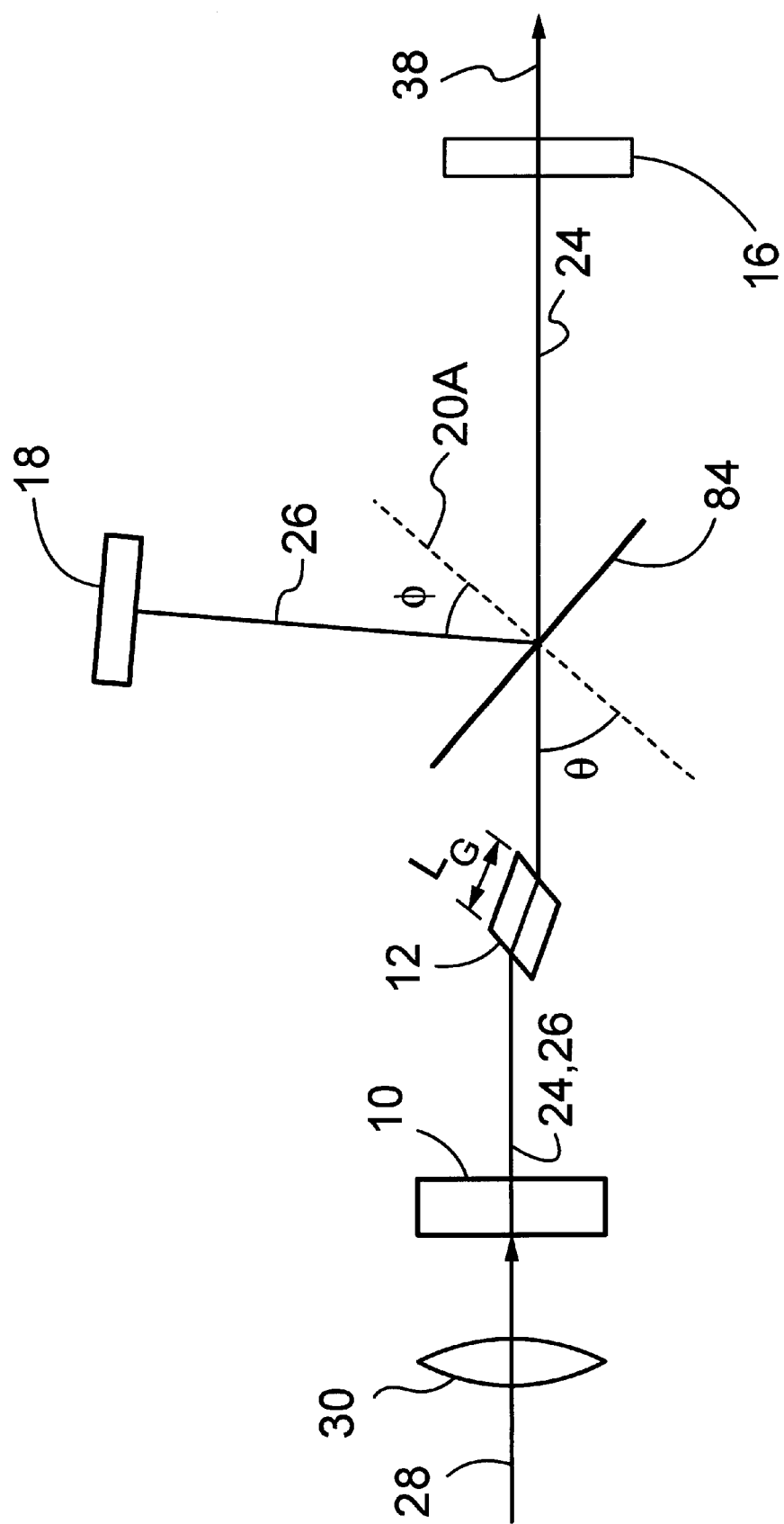
FIG. 10 shows a third embodiment comprising a transmissive grating.

5. A transmissive diffraction grating 84 used instead of the reflective grating 14, as shown in FIG. 10. Beam path 24, defined by zeroth order diffraction, passes straight through transmissive grating 84. Diffraction angle φ is illustrated as being negative in FIG. 10, although φ can take on positive or negative values. Transmissive gratings have much higher damage thresholds than reflective gratings, but have lower diffraction efficiencies.

Thus, the scope of the invention should be determined by the following claims and their legal equivalents.

We claim:

1. A self-seeding, coupled cavity light amplification device comprising:

a) the following elements placed sequentially to provide a first resonant beam path: an end mirror, a gain medium, a grating having a groove spacing, and an output mirror; wherein said first resonant beam path has an angle of incidence upon said grating, and wherein light traveling along said first resonant beam path is zeroth-order diffracted by said grating;

b) a tuning mirror facing said grating, for reflecting light diffracted away from said first resonant beam path by said grating, said tuning mirror providing a Littman cavity comprising said end mirror, said gain medium, said grating, and said tuning mirror;

wherein said groove spacing and said angle of incidence are selected to provide an adjacent mode walk-off time of said Littman cavity that is less than a mode build-up time of said Littman cavity.

2. The light amplification device of claim 1, wherein:

c) said first resonant beam path has a first length, and said Littman cavity has a second length;

d) immediately after said gain medium is activated, said first resonant beam path is characterized by a first gain, and said Littman cavity is characterized by a second gain; and e) said first and second lengths are selected such that said first gain is less than said second gain.

3. The light amplification device of claim 1, farther comprising a means for adjusting an angle between a normal to said grating and a normal to said tuning mirror.

4. A method for operating a self-seeding, coupled cavity laser in a single longitudinal mode of wavelength λ, wherein said laser comprises:

(i) the following elements placed sequentially to provide a first resonant beam path: an end mirror, a gain medium, a grating having a groove spacing d, and an output mirror; wherein said first resonant beam path has an angle of incidence θ upon said grating, and wherein light traveling along said first resonant beam path is zeroth-order diffracted by said grating; and (ii) a tuning mirror facing said grating, for reflecting light diffracted away from said first resonant beam path by said grating, said tuning mirror providing a Littman cavity comprising said end mirror, said gain medium, said grating, and said tuning mirror;

and wherein said method comprises the steps of:

a) exciting a pump region within said gain medium, said pump region having a radius w;

b) choosing said groove spacing d, said angle of incidence θ, and said radius w to provide an adjacent mode walk-off time of said Littman cavity that is less than a mode build-up time of said Littman cavity.

5. The method of claim 4, wherein: said Littman cavity has a length $L_2$ and said adjacent mode walk-off time is equal to $2(2\,d\,w\,\cos\theta)^{1/2}L_2/(\lambda c)$, c being the speed of light.

6. The method of claim 4, wherein:

c) said first resonant beam path has a first length, and said Littman beam path has a second length; and d) immediately after said step of exciting said pump region is completed, said first resonant cavity is characterized by a first gain and said Littman cavity is characterized by a second gain;

and wherein said method further comprises the step of selecting said first and second lengths to make said first gain less than said second gain.

7. The method of claim 4, wherein said grating is a reflective grating, and wherein said light traveling along said first resonant beam path is specularly reflected by said grating.

8. The method of claim 4, wherein said grating is a transmissive grating.

9. The method of claim 4, further comprising the step of adjusting an angle between a normal to said grating and a normal to said tuning mirror, thereby determining said wavelength $\lambda$ of said single longitudinal mode.

10. A method for operating a self-seeding, coupled cavity laser in at least a first longitudinal mode of a first wavelength $\lambda$, and a second longitudinal mode of a second wavelength $\lambda'$, wherein said laser comprises:

(i) the following elements placed sequentially to provide a first resonant beam path: an end mirror, a gain medium, a rating having a groove spacing d, and an output mirror; wherein said first resonant beam path has an angle of incidence $\theta$ upon said grating, and wherein light traveling alone said first resonant beam path is zeroth-order diffracted by said grating; and (ii) a tuning mirror facing said grating, for reflecting light of the first wavelength $\lambda$ diffracted away from said first resonant beam path by said grating, said tuning mirror providing a Littman cavity comprising said end mirror, said gain medium, said grating, and said tuning mirror;

and wherein said method comprises the steps of:
a) exciting a pump region within said gain medium, said pump region having a radius w; and
b) choosing said groove spacing d, said angle of incidence $\theta$, and said radius w to provide an adjacent mode walk-off time of said Littman cavity that is less than a mode build-us time of said Littman cavity, wherein said laser further comprises a second tuning mirror facing said grating, for reflecting light of the second wavelength $\lambda'$ that is diffracted away from said first resonant beam path by said grating; whereby said laser lases at said first and second wavelengths $\lambda$ and $\lambda'$ simultaneously.

* * * * *